United States Patent
Morita (10) Patent No.: US 10,454,224 B2
(45) Date of Patent: Oct. 22, 2019

(54) DC POWER SUPPLY CONNECTOR AND DC POWER SOURCE DEVICE

(71) Applicant: Sony Corporation, Tokyo (JP)

(72) Inventor: Tadashi Morita, Tokyo (JP)

(73) Assignee: Sony Corporation, Tokyo (JP)

(*) Notice: Subject to any disclaimer, the term of this patent is extended or adjusted under 35 U.S.C. 154(b) by 237 days.

(21) Appl. No.: 15/548,547

(22) PCT Filed: Dec. 28, 2015

(86) PCT No.: PCT/JP2015/086558
§ 371 (c)(1),
(2) Date: Aug. 3, 2017

(87) PCT Pub. No.: WO2016/129198
PCT Pub. Date: Aug. 18, 2016

(65) Prior Publication Data
US 2018/0006409 A1 Jan. 4, 2018

(30) Foreign Application Priority Data
Feb. 13, 2015 (JP) ................................. 2015-026483

(51) Int. Cl.
*H02H 7/00* (2006.01)
*H01R 13/703* (2006.01)
(Continued)

(52) U.S. Cl.
CPC ............ *H01R 13/703* (2013.01); *H01H 9/54* (2013.01); *H01H 33/143* (2013.01);
(Continued)

(58) Field of Classification Search
None
See application file for complete search history.

(56) References Cited

U.S. PATENT DOCUMENTS

| 4,686,478 A * | 8/1987 | Jabs .................... G01R 31/3278 324/420 |
| 2018/0006447 A1 * | 1/2018 | Morita .................... H02H 9/025 |

FOREIGN PATENT DOCUMENTS

| JP | 2003-203721 A | 7/2003 |
| JP | 2005-294080 A | 10/2005 |

(Continued)

OTHER PUBLICATIONS

International Search Report and Written Opinion and English translation thereof dated Apr. 5, 2016 in connection with International Application No. PCT/JP2015/086558.
(Continued)

*Primary Examiner* — Stephen W Jackson
(74) *Attorney, Agent, or Firm* — Wolf, Greenfield & Sacks, P.C.

(57) ABSTRACT

An object is to provide a DC power supply connector that can suppress occurrence of an arc discharge at DC power off with a small-scale configuration without reducing power efficiency during DC power supply and can reduce heat generation.

The connector includes, on at least any of a positive-electrode-side electrode side and a negative-electrode-side electrode side, a movable contact piece (20c) that touches a first contact (25) in a state where a terminal (11) on a power receiving side has been inserted and to touch a second contact (24) in a state where the terminal has not been inserted, and a current limiting circuit (30) including a switching element (T1). The current limiting circuit (30) does not flow a current to the switching element (T1) in the case where the movable contact piece (20c) is touching the first contact (25), and flows a current to the terminal (11) through the movable contact piece (20c) until the movable contact piece (20c) is linked to the second contact (24) after separation from the first contact (25), and gradually decreases the flowing current.

9 Claims, 8 Drawing Sheets

(51) Int. Cl.
  *H02H 9/02*     (2006.01)
  *H01H 9/54*     (2006.01)
  *H01H 33/14*    (2006.01)
  *H01H 47/00*    (2006.01)
  *H02H 5/12*     (2006.01)
  *H01R 13/66*    (2006.01)

(52) U.S. Cl.
  CPC ....... *H01H 47/002* (2013.01); *H01R 13/7036* (2013.01); *H02H 5/12* (2013.01); *H02H 9/02* (2013.01); *H01R 13/665* (2013.01)

(56) References Cited

FOREIGN PATENT DOCUMENTS

| | | |
|---|---|---|
| JP | 2011-003409 A | 1/2011 |
| JP | 2011-034687 A | 2/2011 |
| JP | 2014-522088 A | 8/2014 |

OTHER PUBLICATIONS

International Preliminary Report on Patentability and English translation thereof dated Aug. 24, 2017 in connection with International Application No. PCT/JP2015/086558.

* cited by examiner

DC POWER SUPPLY CONNECTOR AND DC POWER SOURCE DEVICE

CROSS REFERENCE TO RELATED APPLICATIONS

This is a U.S. National Stage Application under 35 U.S.C. § 371, based on International Application No. PCT/JP2015/086558, filed Dec. 28, 2015, which claims priority to Japanese Patent Application JP 2015-026483, filed Feb. 13, 2015, each of which is hereby incorporated by reference in its entirety.

TECHNICAL FIELD

The present disclosure relates to a DC power supply connector and a DC power source device.

BACKGROUND ART

In either DC power feeding or AC power feeding, an arc discharge occurs at power off. In the case of AC, since there is an instant at which the voltage becomes zero at every predetermined time (for example, every 10 milliseconds), the arc discharge stops spontaneously at least within the above-described predetermined time (for example, within 10 milliseconds). In DC power feeding, however, the arc discharge does not stop spontaneously since there is no instant at which the voltage becomes zero.

Therefore, technologies for the purpose of suppressing occurrence of an arc discharge at power off in the case of DC power feeding have been disclosed (see Patent Literature 1, Patent Literature 2 and the like).

CITATION LIST

Patent Literature

Patent Literature 1: JP 2003-203721A
Patent Literature 2: JP 2014-522088T

DISCLOSURE OF INVENTION

Technical Problem

Occurrence of an arc discharge should certainly be suppressed at power off in the case of DC power feeding, while it is unpreferable that a configuration for suppressing occurrence of an arc discharge be increased in scale. It is also unpreferable that the addition of the configuration for suppressing occurrence of an arc discharge reduce power supply efficiency during DC power feeding. It is therefore desirable to suppress occurrence of an arc discharge at DC power off with a small-scale configuration without reducing power efficiency during DC power supply. It is further demanded to reduce heat generation when suppressing occurrence of an arc discharge at DC power off.

Therefore, the present disclosure proposes a DC power supply connector and a DC power source device being novel and improved that can suppress occurrence of an arc discharge at DC power off with a small-scale configuration without reducing power efficiency during DC power supply and can reduce heat generation.

Solution to Problem

According to the present disclosure, there is provided a DC power supply connector at least including a positive-electrode-side electrode and a negative-electrode-side electrode configured to supply DC power. Provided on at least any of a positive-electrode-side electrode side and a negative-electrode-side electrode side are a movable contact piece configured to touch a first contact in a state where a terminal on a power receiving side in which a DC current flows at supply of the DC power is inserted and configured to touch a second contact in a state where the terminal is not inserted, and a current limiting circuit configured to include a switching element and configured to decrease the current flowing in the terminal through the movable contact piece when the terminal is removed. The current limiting circuit does not flow a current to the switching element in the case where the movable contact piece is touching the first contact, and flows a current to the terminal through the movable contact piece until the movable contact piece is separated from the first contact and linked to the second contact, and gradually decreases the flowing current.

In addition, according to the present disclosure, there is provided a DC power source device at least including: a DC power source configured to supply DC power; and a positive-electrode-side electrode and a negative-electrode-side electrode configured to supply the DC power from the DC power source. Provided on at least any of a positive-electrode-side electrode side and a negative-electrode-side electrode side are a movable contact piece configured to touch a first contact in a state where a terminal on a power receiving side in which a DC current flows at supply of the DC power is inserted and configured to touch a second contact in a state where the terminal is not inserted, and a current limiting circuit configured to include a switching element and configured to decrease the current flowing in the terminal through the movable contact piece when the terminal is removed. The current limiting circuit does not flow a current to the switching element in a case where the movable contact piece is touching the first contact, and flows a current to the terminal through the movable contact piece until the movable contact piece is separated from the first contact and linked to the second contact, and gradually decreases the flowing current.

Advantageous Effects of Invention

According to the present disclosure as described above, there can be provided a DC power supply connector and a DC power source device being novel and improved that can suppress occurrence of an arc discharge at DC power off with a small-scale configuration without reducing power efficiency during DC power supply and can reduce heat generation.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of the present disclosure
1.1. Background
1.2. Exemplary configuration
2. Conclusion

1. Embodiment of the Present Disclosure

[1.1. Background]

Before describing an embodiment of the present disclosure in detail, the background of an embodiment of the present disclosure will be described first.

In either DC power feeding or AC power feeding, a spark or an arc discharge due to a potential difference between electrodes occurs at power off when a voltage and a current reach certain predetermined values or higher. In the case of AC, since there is an instant at which the voltage becomes zero at every predetermined time (for example, every 10 milliseconds), the arc discharge stops spontaneously at least within the above-described predetermined time (for example, within 10 milliseconds).

In DC power feeding, however, the arc discharge does not stop spontaneously since there is no instant at which the voltage becomes zero unlike AC power feeding. The arc discharge causes degradation of contacts, such as ignition, metal fusing or welding, resulting in risks, such as a reduction in reliability of power feeding and a fire.

Therefore, technologies for the purpose of suppressing occurrence of an arc discharge at power off in the case of DC power feeding have been disclosed. For example, an avoidance technology by connecting a snubber circuit, in which a capacitor and a resistor are used, between oscillating contact elements has been conventionally proposed.

In order to prevent an arc discharge using the snubber circuit in the case of DC power feeding, however, sufficient effects will not be obtained unless a large-capacity capacitor and a small resistor are used. For obtaining sufficient effects, the snubber circuit will be increased in size. Moreover, in the case of preventing an arc discharge using the snubber circuit, a short-circuit current due to charges charged in the large-capacity capacitor will be increased if an attempt is made to make reconnection to a DC power source after DC power off, so that contacts will be welded.

Furthermore, in the case of performing DC power feeding by inserting/removing an insertion plug in/from a plug receiver, there is also a technology for providing the insertion plug with a mechanical switch to prevent occurrence of an arc discharge, and operating the mechanical switch when removing the insertion plug from the plug receiver, thereby preventing occurrence of an arc discharge. However, this technology raises the need to force a user to perform a complicated operation of operating the mechanical switch at removal of the insertion plug.

There is also a method of mechanically removing an arc discharge. In order to mechanically remove an arc discharge, however, a structure is required which increases the speed of detaching contacts or detaches arcs by a magnetic circuit, resulting in size increase of a circuit for removing an arc discharge.

The technologies for the purpose of suppressing occurrence of an arc discharge at power off in the case of DC power feeding are found additionally in the above-mentioned Patent Literature 1, Patent Literature 2 and the like.

The above-mentioned Patent Literature 1 discloses a technology for providing a switching element on a path along which a current flows during DC power feeding, and turning off the switching element at removal of the insertion plug from the plug receiver, thereby suppressing occurrence of an arc discharge.

According to the technology disclosed in the Patent Literature 1, however, power is consumed in the switching element during DC power feeding and the switching element generates heat during DC power feeding since a current flows through the switching element during DC power feeding.

The above-mentioned Patent Literature 2 also discloses a technology for providing an arc absorbing circuit including switching elements on a path along which a current flows during DC power feeding, and turning off the switching elements at removal of the insertion plug from the plug receiver, thereby suppressing occurrence of an arc discharge.

According to the technology disclosed in the Patent Literature 2, however, two switching elements as the arc absorbing circuit and a timer for turning off the switching element are provided, which requires a circuit for temporarily storing arc power and discharging the stored power, resulting in size increase of the circuit.

In consideration of the above-described background, the discloser of the present application has therefore conducted intense study on a technology capable of suppressing occurrence of an arc discharge with a small-scale configuration at DC power off without reducing power efficiency during DC power supply. As a result, the discloser of the present application has devised a technology capable of suppressing occurrence of an arc discharge with a small-scale configuration at DC power off without reducing power efficiency during DC power supply and capable of reducing heat generation at DC power off, by providing a positive-electrode-side electrode with two contacts and, when switching contacts with a power-receiving-side electrode, suppressing a voltage generated between the electrodes at DC power off, as will be described below.

The background of an embodiment of the present disclosure has been described above. Next, an embodiment of the present disclosure will be described in detail.

[1.2. Exemplary Configuration]

Figure 1:
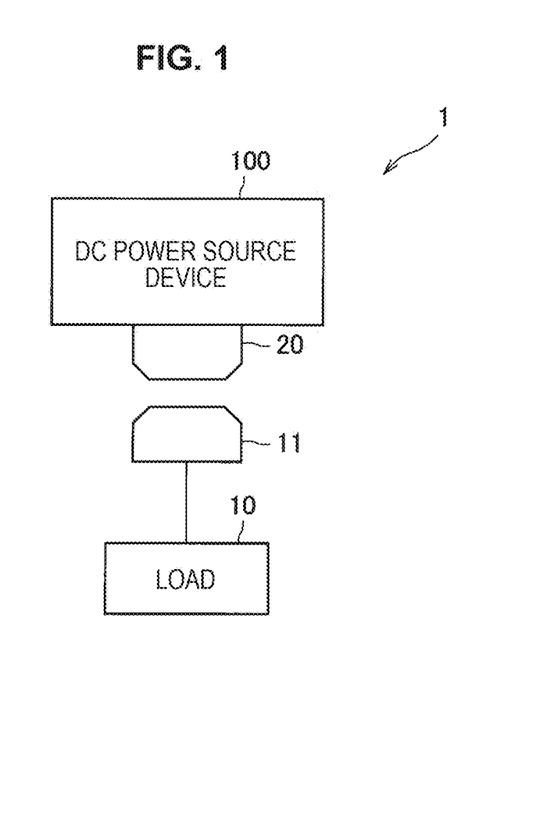
FIG. 1 is an explanatory diagram showing an exemplary configuration of a DC power supply system according to an embodiment of the present disclosure.

First, an exemplary configuration of a DC power supply system according to an embodiment of the present disclosure will be described. FIG. 1 is an explanatory diagram showing an exemplary configuration of a DC power supply system according to an embodiment of the present disclosure. Hereinbelow, the exemplary configuration of the DC power supply system according to an embodiment of the present disclosure will be described using FIG. 1.

FIG. 1 shows an exemplary configuration of a DC power supply system 1 including the DC power source device 100 that feeds DC power and a load 10 that receives DC power from the DC power source device 100. The DC power source device 100 is a power source device that feeds DC power, and for example, may be a device that includes a storage battery in the inside to feed DC power to the load 10, or may be a device that feeds power generated by sunlight, wind power, geothermal heat, biomass, or another type of natural energy to the load 10 as DC power.

When the load 10 receives feeding of DC power from the DC power source device 100, the plug 11 is inserted in the plug receiver 20. Then, when stopping feeding of DC power from the DC power source device 100, the plug 11 is removed from the plug receiver 20. Failure in considering suppression of an arc discharge leads to damage or the like to the plug 11 or the plug receiver 20 as described above when the plug 11 is removed from the plug receiver 20.

Therefore, in the present embodiment, the DC power source device 100 includes a current limiting circuit for suppressing a current flowing from the DC power source device 100 to the load 10 when the plug 11 is removed from the plug receiver 20 in order to suppress an arc discharge when the plug 11 is removed from the plug receiver 20.

The DC power source device 100 is configured such that no current flows in the current limiting circuit provided for the DC power source device 100 when the plug 11 is completely inserted in the plug receiver 20 and while DC power is fed from the DC power source device 100 to the load 10. Moreover, when the plug 11 is removed from the plug receiver 20, the current limiting circuit functions in a direction that the current flowing from the DC power source device 100 to the load 10 is decreased while flowing the current from the DC power source device 100 to the load 10 through the current limiting circuit.

In the present embodiment, occurrence of an arc discharge can be suppressed at DC power off without reducing power efficiency during DC power supply by providing the DC power source device 100 with the current limiting circuit as described above. Moreover, since the current limiting circuit according to the present embodiment can be a small-scale circuit as will be described later, occurrence of an arc discharge can be suppressed at DC power off without increasing the circuit scale.

Moreover, in the present embodiment, as will be described later, the DC power source device 100 is provided with a mechanism capable of switching between supplying DC power to the load 10 without passing through the current limiting circuit in the state where the plug 11 of the load 10 has been completely inserted in the plug receiver 20 and supplying DC power to the load 10 via the current limiting circuit after the plug 11 of the load 10 is removed the plug receiver 20. By providing the DC power source device 100 with such a mechanism, occurrence of an arc discharge can be suppressed at DC power off.

Furthermore, in the present embodiment, as will be described later, the DC power source device 100 is provided with a mechanism capable of performing switching so as to supply DC power to the load 10 immediately via the current limiting circuit when the plug 11 of the load 10 is removed from the plug receiver 20. By providing the DC power source device 100 with such a mechanism, heat generation in the current limiting circuit, in particular, heat generation in the switching element when the plug 11 of the load 10 is removed from the plug receiver 20 can be reduced.

An exemplary configuration of the DC power supply system according to an embodiment of the present disclosure has been described above using FIG. 1. Subsequently, a specific exemplary configuration of the DC power source device 100 according to an embodiment of the present disclosure will be described.

Figure 2:
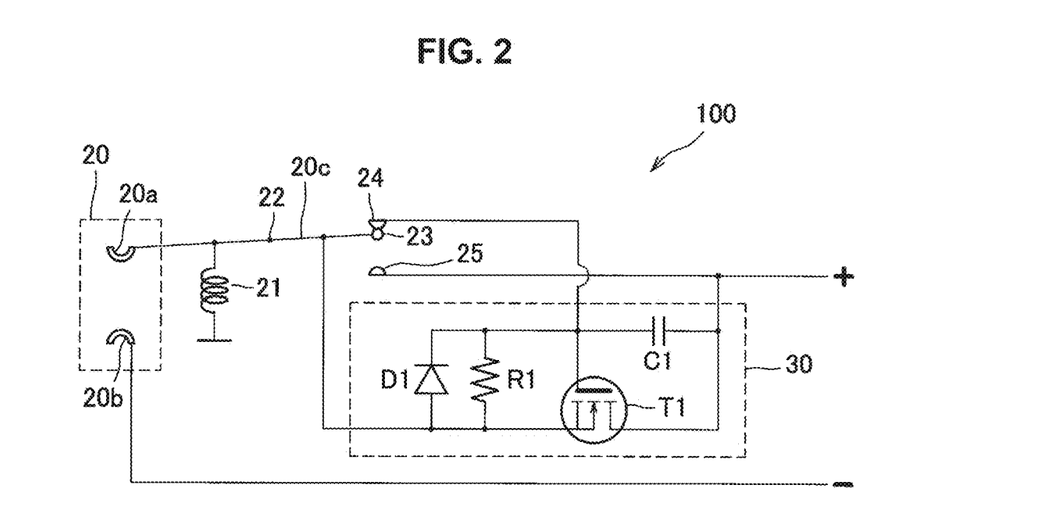
FIG. 2 is an explanatory diagram showing an exemplary configuration of a DC power source device 100 according to an embodiment of the present disclosure.

FIG. 2 is an explanatory diagram showing an exemplary configuration of the DC power source device 100 according to an embodiment of the present disclosure. Hereinbelow, the exemplary configuration of the DC power source device 100 according to an embodiment of the present disclosure will be described using FIG. 2.

As shown in FIG. 2, the DC power source device 100 according to an embodiment of the present disclosure includes contact elements 20a, 20b, 23, 24, 25, a movable contact piece 20c, a spring 21, and the current limiting circuit 30. The contact elements 20a and 20b are provided in the inside of the plug receiver 20. FIG. 2 also shows a positive-electrode-side terminal 11a and a negative-electrode-side terminal 11b which are a pair of electrodes of the plug 11.

The contact elements 20a and 20b are conductors for flowing a current from the DC power source device 100 to the load 10. The contact elements 20a and 20b are conductors for flowing a current from the DC power source device 100 to the load 10 by being connected respectively to the positive-electrode-side terminal 11a and the negative-electrode-side terminal 11b which are a pair of electrodes of the plug 11.

The spring 21 is connected to the movable contact piece 20c, and is provided such that the contact element 23 provided for the movable contact piece 20c is separated from the contact element 24 and connects to the contact element 25 in the state where the plug 11 has been inserted in the plug receiver 20, and such that the contact element 23 provided for the movable contact piece 20c is separated from the contact element 25 and connects to the contact element 24 with an elastic force in the state where the plug 11 has not been inserted in the plug receiver 20. Therefore, the movable contact piece 20c is configured in the DC power source device 100 as a momentary switch in which the elastic force of the spring 21 is utilized.

The movable contact piece 20c is formed of a material that electrically conducts the contact element 20a and the contact element 23, and is a movable contact piece configured to be pivotable in a predetermined range about a supporting point 22. The movable contact piece 20c is connected to the spring 21 as described above, and is provided such that the contact element 23 touches the contact element 24 or the contact element 25 with an elastic force in accordance with insertion or removal of the plug 11.

Figure 3:
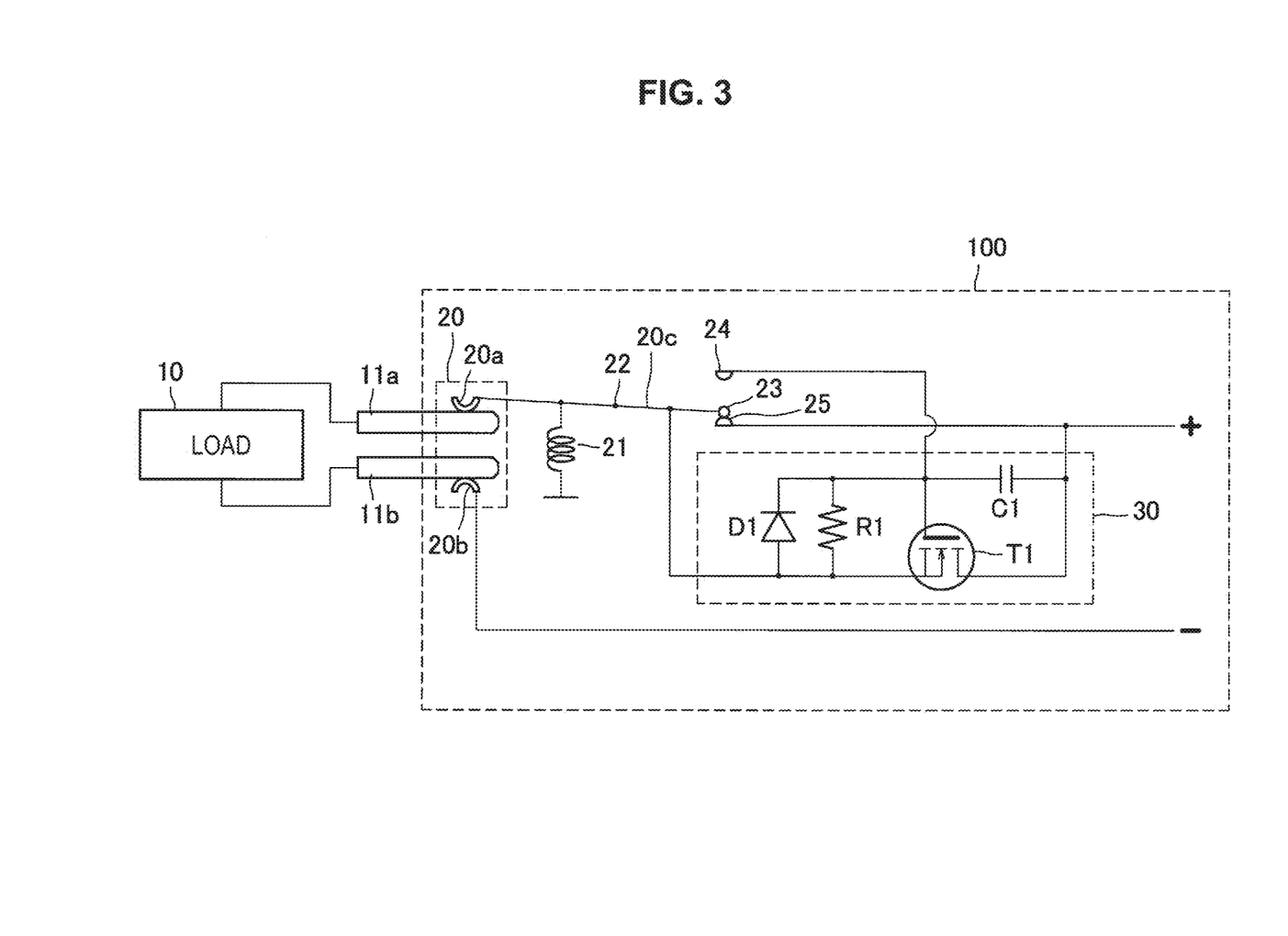
FIG. 3 is an explanatory diagram showing a state where a plug 11 has been inserted in a plug receiver 20.

FIG. 3 is an explanatory diagram showing the state where the plug 11 has been inserted in the plug receiver 20. When the plug 11 is inserted in the plug receiver 20, the spring 21 is stretched as shown in FIG. 3, and the contact element 23 of the movable contact piece 20c is separated from the contact element 24 to connect to the contact element 25. When the contact element 23 is separated from the contact element 24 to connect to the contact element 25, a current flows from the DC power source device 100 to the load 10.

The current limiting circuit 30 is a circuit that functions so as not to flow a current while DC power is being fed from the DC power source device 100 to the load 10, but so as to decrease the current flowing from the DC power source device 100 to the load 10 when the contact element 23 is separated from the contact element 25 to connect to the contact element 24.

In the current limiting circuit 30, no current flows in the state where the plug 11 has been completely inserted in the plug receiver 20 and the contact element 23 connects to the contact element 25, and a current flows in the state where the positive-electrode-side terminal 11a is connected to the contact element 20a. Therefore, since the current limiting circuit 30 does not flow a current in the state where the plug 11 has been completely inserted in the plug receiver 20, the DC power source device 100 can feed DC power to the load 10 without reducing power efficiency during DC power supply.

The current limiting circuit 30 includes a MOSFET T1, a capacitor C1, a resistor R1, and a diode D1. The current limiting circuit 30 functions as a voltage integrating circuit by including the capacitor C1.

In the present embodiment, an n-type metal oxide semiconductor field effect transistor (MOSFET) is used for the MOSFET T1. The MOSFET T1 is provided on a path along which a current flows from the DC power source device 100 to the positive-electrode-side terminal 11a in the state where the contact element 23 is touching the contact element 24 (that is, in the state where the plug 11 has been removed from the plug receiver 20).

The capacitor C1 is provided between a drain terminal and a gate terminal of the MOSFET T1. Moreover, the resistor R1 is provided between the gate terminal and a source terminal of the MOSFET T1. Furthermore, the capacitor C1 and the resistor R1 are connected in series as shown in FIG. 2 and FIG. 3.

The function of the current limiting circuit 30 configured as shown in FIG. 2 and FIG. 3 will be described. As described above, when the plug 11 provided for the load 10 is completely inserted in the plug receiver 20, the spring 21 is stretched by insertion of the plug 11, allowing the contact element 23 of the movable contact piece 20c to connect to the contact element 25.

In the state where the contact element 23 of the movable contact piece 20c connects to the contact element 25, the current limiting circuit 30 is bypassed on the path along which the current flows from the DC power source device 100 to the positive-electrode-side terminal 11a. Therefore, in the state where the plug 11 has been completely inserted in the plug receiver 20, no current flows in the current limiting circuit 30. Thus, in the state where the plug 11 has been completely inserted in the plug receiver 20, power will not be consumed in the current limiting circuit 30.

On the other hand, when the contact element 23 is switched to connect to the contact element 24 from the contact element 25 with the elastic force of the spring 21 before the plug 11 is removed from the plug receiver 20 (for example, immediately before the plug 11 is removed from the plug receiver 20), current concentration occurs at a part of a touch point between the positive-electrode-side terminal 11a and the contact element 20a. When current concentration occurs at a part of the touch point between the positive-electrode-side terminal 11a and the contact element 20a, the gate voltage of the MOSFET T1 is induced via the capacitor C1 to bring the MOSFET T1 into the on state.

When the MOSFET T1 is brought into the on state, a current starts flowing to the load 10 through the current limiting circuit 30, but with a decrease of the current flowing to the load 10 through the current limiting circuit 30, the potential difference between the positive-electrode-side terminal 11a and the contact element 20a is reduced. With the potential difference between the positive-electrode-side terminal 11a and the contact element 20a reduced, separation of the positive-electrode-side terminal 11a from the contact element 20a will not lead to occurrence of an arc discharge.

The voltage between the drain terminal and the source terminal of the MOSFET T1 falls within voltages along the transfer function in terms of the gate voltage of the FET. When the contact element 23 is switched to connect to the contact element 24 from the contact element 25 with the elastic force of the spring 21 before the plug 11 is removed from the plug receiver 20 (for example, immediately before the plug 11 is removed from the plug receiver 20), charges are accumulated in the capacitor C1.

When charging of the capacitor C1 is advanced, the gate voltage of the MOSFET T1 drops, and the MOSFET T1 transitions to the off state. Since the MOSFET T1 transitions to the off state, the current no longer flows in the MOSFET T1. Separation of the positive-electrode-side terminal 11a from the contact element 20a after the MOSFET T1 transitions to the off state will not lead to occurrence of an arc discharge since no current flows in the MOSFET T1.

The diode D1 connected in parallel with the resistor R1 of the current limiting circuit 30 is provided for discharging charges accumulated in the capacitor C1 within a short period of time without passing through the resistor R1 in the case where the contact element 23 is switched to connect to the contact element 24 from the contact element 25.

With the diode D1 provided in parallel with the resistor R1 in the current limiting circuit 30, the voltage integrating function of the current limiting circuit 30 can be recovered within a short period of time even if connection between the contact element 23 and the contact element 24 or the contact element 25, for example, causes a phenomenon such as chattering. The resistor R1 supplies a voltage to the gate terminal of the MOSFET T1. The time for supplying the voltage is determined in relation to the product of the capacitance of the capacitor C1 and the resistance value of the resistor R1.

The effects by which the DC power source device 100 includes the current limiting circuit 30 as shown in FIG. 2 and includes the movable contact piece 20c configured to touch the contact element 24 or the contact element 25 in accordance with insertion or removal of the plug 11 will be described.

Figure 4:
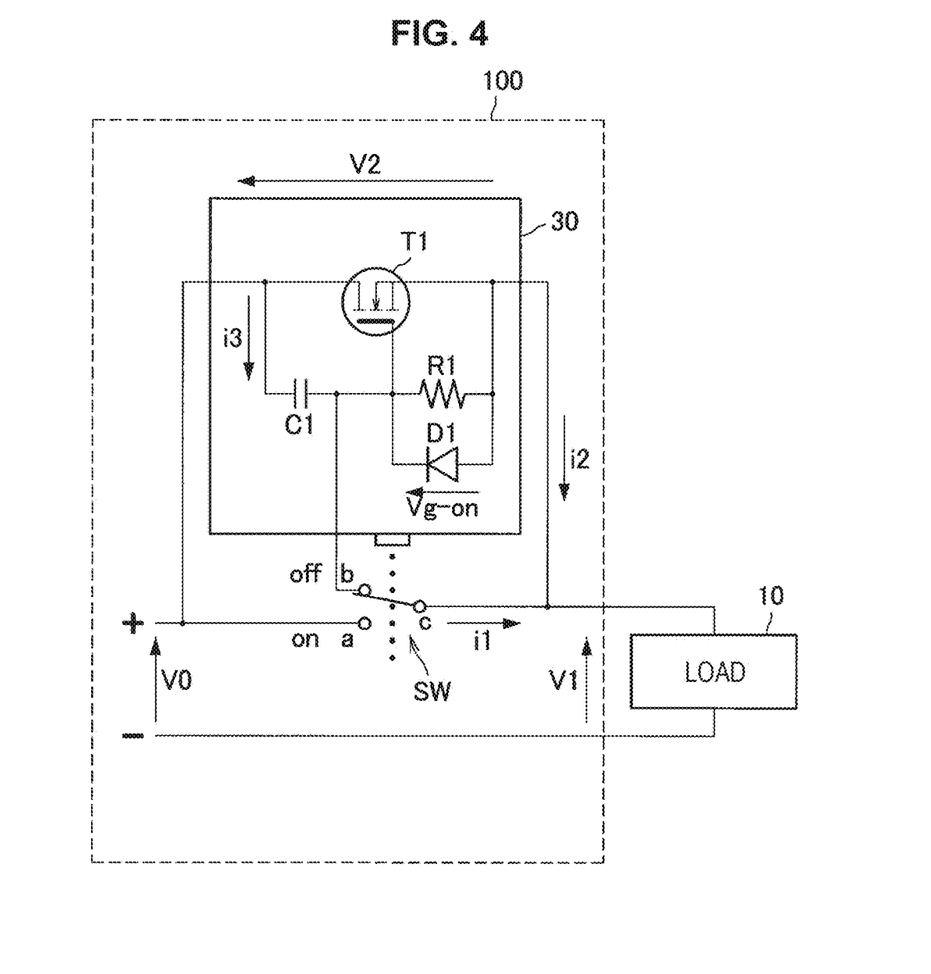
FIG. 4 is an explanatory diagram explaining functions of a current limiting circuit 30.

FIG. 4 is an explanatory diagram showing an exemplary configuration of the DC power source device 100, and an explanatory diagram explaining the functions of the current limiting circuit 30. Shown in FIG. 4 is an exemplary configuration of the DC power source device 100 in which, for simplicity of description, a single-pole double-throw switch SW is used when disconnecting the load 10 from the DC power source device 100, without disconnecting the load 10 from the DC power source device 100 in accordance with insertion or removal of the plug 11.

The exemplary configuration of the DC power source device 100 shown in FIG. 4 is characterized in that a b-contact of the single-pole double-throw switch SW is connected to a node between the capacitor C1 and the resistor R1 of the current limiting circuit 30. By using the single-pole double-throw switch SW when disconnecting the load 10 from the DC power source device 100, occurrence of an arc discharge or a spark (thermal arc) can be suppressed by the current limiting circuit 30.

Figure 5:
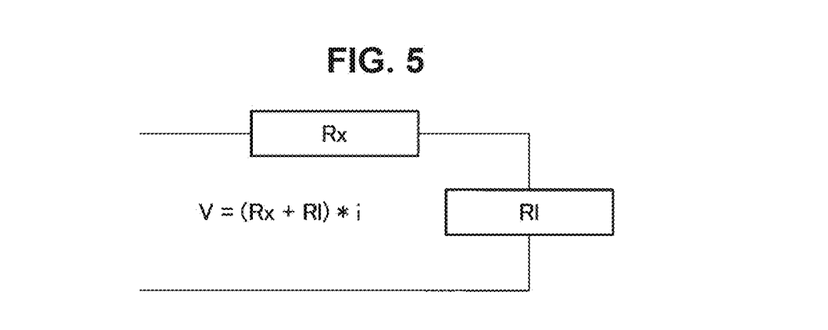
FIG. 5 is an explanatory diagram showing an equivalent circuit of the current limiting circuit 30 shown in FIG. 4.

FIG. 5 is an explanatory diagram showing an equivalent circuit of the current limiting circuit 30 shown in FIG. 4. When it is assumed that Rx indicates the resistance of the DC power source device 100, RI indicates the resistance of the load 10, and i indicates a current, a voltage V is expressed as (Rx+RI)×i.

Figure 6:
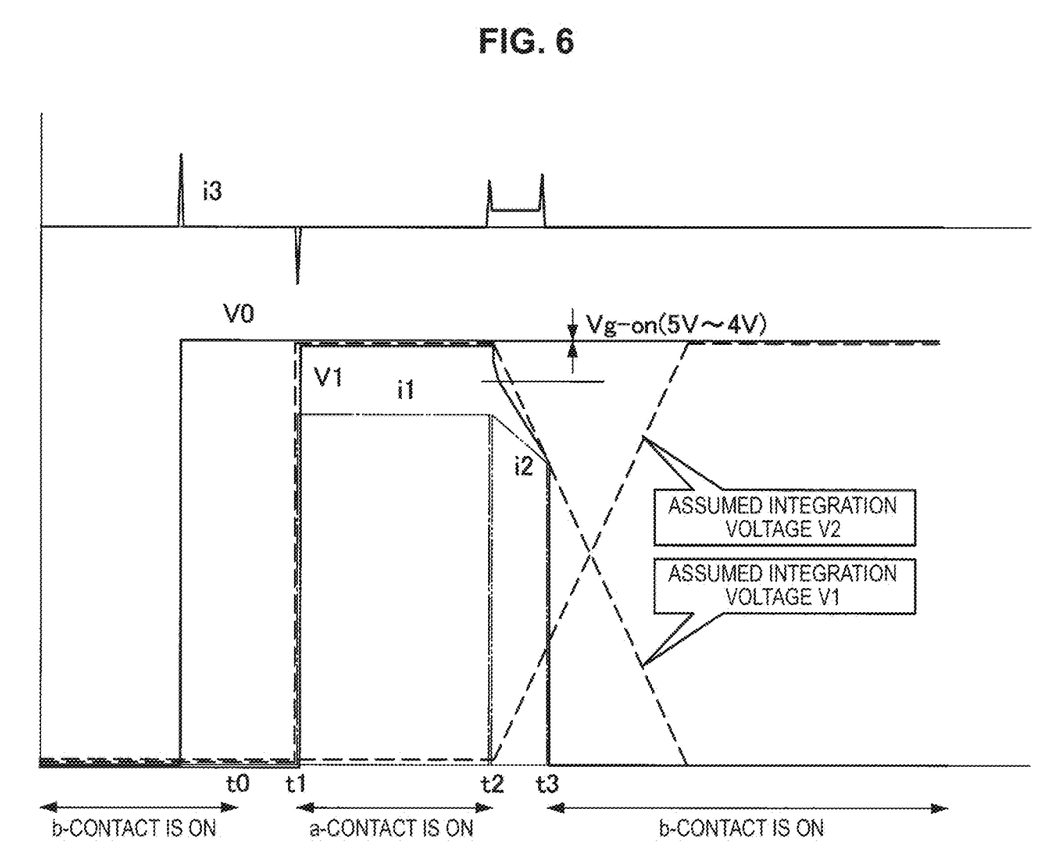
FIG. 6 is an explanatory diagram showing exemplary transitions of currents and voltages in the exemplary configuration of the DC power source device 100 shown in FIG. 4.

FIG. 6 is an explanatory diagram showing exemplary transitions of currents and voltages in the exemplary configuration of the DC power source device 100 shown in FIG. 4.

When a voltage is applied to the DC power source device 100 in the power off state where DC power feeding from the DC power source device 100 to the load 10 is not performed, that is, in the state where the single-pole double-throw switch SW is connected to the b-contact, the voltage V2 is applied to the capacitor C1, and a charging current flows. In a case where the capacitor C1 has a capacitance of approximately 0.1 µF, a microcurrent directly flows in the load 10, and the MOSFET T1 remains in the off state. Therefore, a large current does not flow from the DC power source device 100 to the load 10 since the MOSFET T1 is in the off state.

When the single-pole double-throw switch SW is pressed at a point of time t1 in FIG. 6 to connect a conducting plate to an a-contact, a voltage V0 of the DC power source device 100 is completely applied to the load 10. When the voltage V0 and the voltage V1 of the load 10 reach an equivalent value, the current limiting circuit 30 is brought into the short-circuit state. When the current limiting circuit 30 is brought into the short-circuit state, charges accumulated in the capacitor C1 are discharged rapidly via the diode D1.

When the single-pole double-throw switch SW is pressed at a point of time t2 in FIG. 6 to release the connection between the conducting plate and the a-contact, the voltage V2 which is the drain-source voltage of the MOSFET T1 starts to rise, and a current i3 flows in the capacitor C1. The flow of the current i3 in the capacitor C1 produces a voltage in the resistor R1, and when a gate voltage Vg of the MOSFET T1 rises to Vg-on, the MOSFET T1 is turned on. When the MOSFET T1 is turned on, the charging voltage of the capacitor C1 rises gradually, while the current i2 flowing from the DC power source device 100 to the load 10 decreases.

When the switching operation of the single-pole double-throw switch SW ends, the conducting plate of the single-pole double-throw switch SW and the b-contact are connected at a point of time t3 in FIG. 6. The gate voltage Vg of the MOSFET T1 reaches 0V, and the current i2 flowing from the DC power source device 100 to the load 10 is interrupted. In removal of the plug 11 from the DC power source device 100 in the circuit in which the b-contact is used, voltage integration ends at the point of time when the conducting plate is returned to the b-contact.

By the above-described series of operations, the DC power source device 100 shown in FIG. 4 prevents the current limiting circuit 30 from operating when the voltage V0 of the DC power source device 100 is applied to the load 10 as an initial state. Moreover, when in the off operation of the single-pole double-throw switch SW, the DC power source device 100 shown in FIG. 4 can ensure a distance that an arc discharge does not occur even if the conducting plate is separated sufficiently from the contact a and is separated even to the contact b, and suspends the operation of the current limiting circuit 30 to reduce unnecessary power consumption, and reduces heat generation of the MOSFET T1 which is a switching element.

Figure 7:
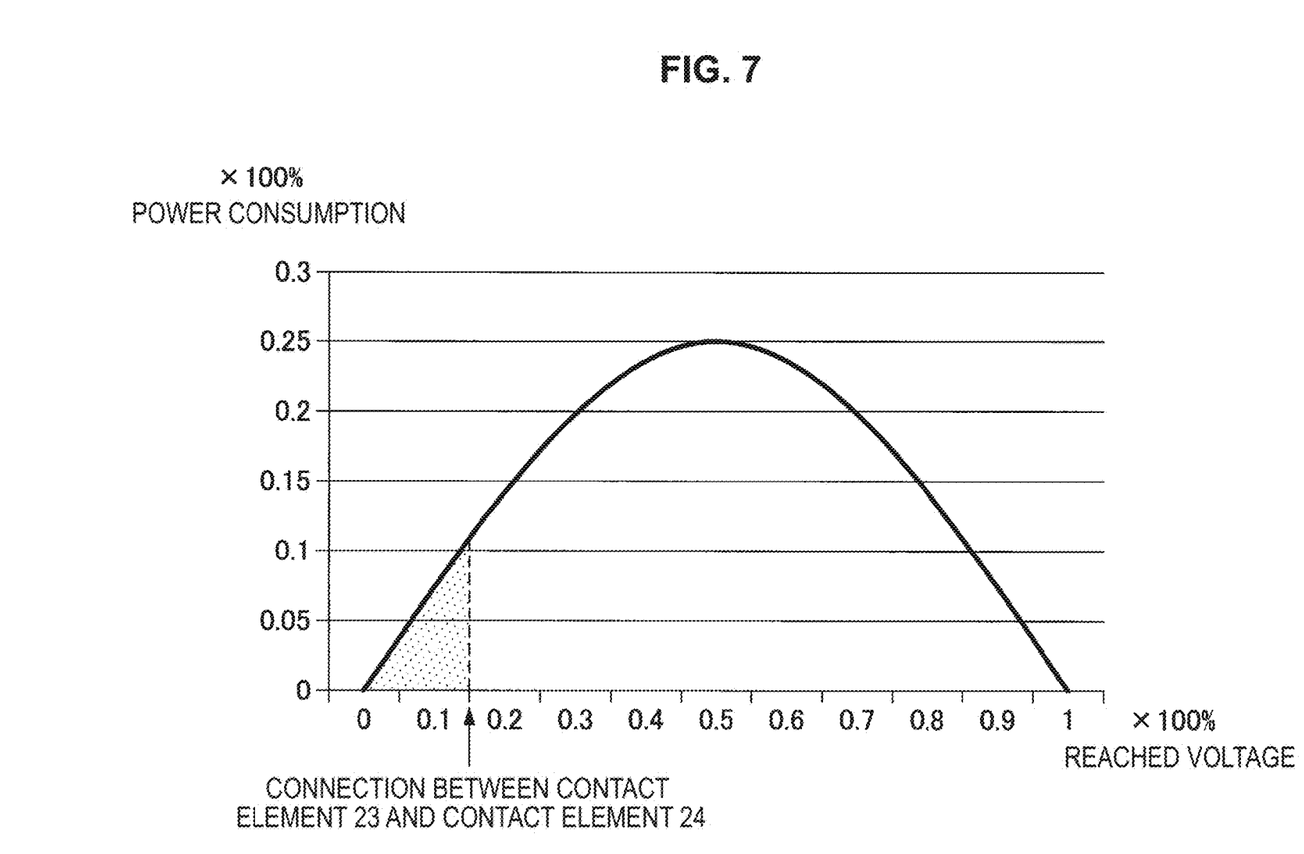
FIG. 7 is an explanatory diagram showing power consumption of the current limiting circuit 30.

FIG. 7 is an explanatory diagram showing power consumption of the current limiting circuit 30. Power consumption of the current limiting circuit 30 is maximized at the center of voltage integration. Therefore, with the current interrupted prior to the center of voltage integration, that is, at a point of time when the reached voltage is less than 50% (at a point of time of approximately 20% in the example of FIG. 7), power consumption of the current limiting circuit 30 is reduced.

Figure 8:
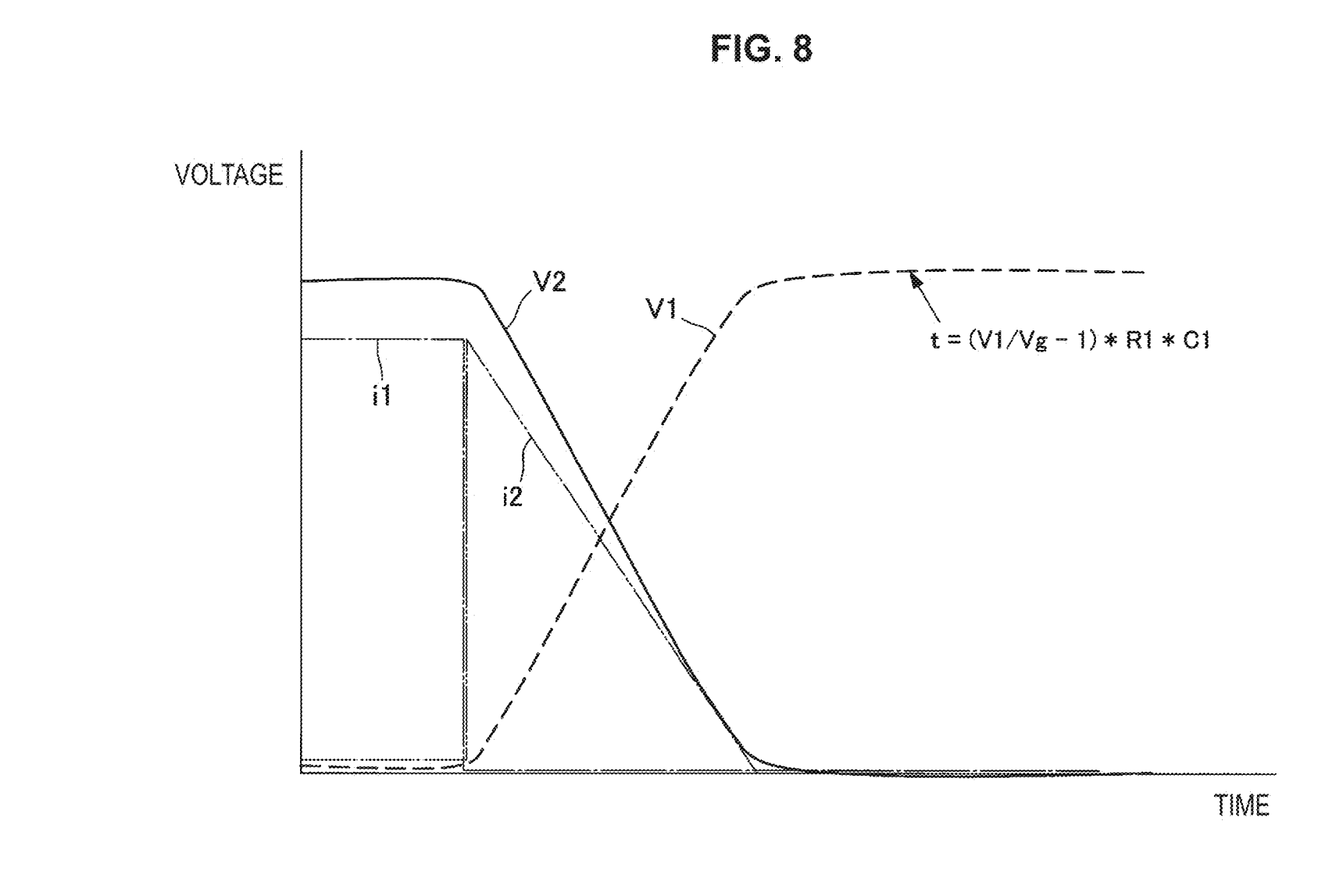
FIG. 8 is an explanatory diagram showing an example of changes of voltages and currents when the plug 11 is removed from the DC power source device 100.

FIG. 8 is an explanatory diagram showing an example of changes of voltages and currents when the plug 11 is removed from the DC power source device 100, and an explanatory diagram showing voltage changes of the end-to-end voltage V1 of the current limiting circuit 30, voltage changes of the voltage V2 applied to the load 10, and time changes of the currents i1 and i2 in FIG. 4. Note that FIG. 8 shows an example of changes of voltages and currents when the plug 11 is removed from the DC power source device 100 without using the single-pole double-throw switch SW as shown in FIG. 4.

The end-to-end voltage V1 of the current limiting circuit 30 remains at a constant voltage, and as removal of the plug 11 progresses, the end-to-end voltage V1 rises gradually, while the voltage V2 applied to the load 10 drops gradually.

Moreover, the current i1 flowing to the contact element 20a side drops suddenly to 0 A, while the current i2 flowing to the contact element 20b side rises suddenly from 0 A. With the current i1 dropping suddenly to 0 A and the current i2 rising suddenly from 0 A, the current limiting circuit 30 suppresses occurrence of a potential difference between the positive-electrode-side terminal 11a and the contact element 20a.

Then, the drop in the voltage V2 applied to the load 10 and the current i2 has progressed, and there is no condition where current concentration between the positive-electrode-side terminal 11a and the contact element 20b occurs. Therefore, separation of the positive-electrode-side terminal 11a from the contact element 20a will not lead to occurrence of an arc discharge.

Here, in removal of the plug 11 from the DC power source device 100 in the circuit in which two contacts are used as in FIG. 4, voltage integration ends at the point of time when the conducting plate is returned to the b-contact. On the other hand, in the case where the circuit in which two contacts are used as in FIG. 4 is not used, the current limiting circuit 30 continues integration until the voltage value becomes equal to the supply voltage of the DC power source device 100.

Therefore, in removal of the plug 11 from the DC power source device 100 in the circuit in which two contacts are used as in FIG. 4, voltage integration ends at the point of time when the conducting plate is returned to the b-contact. Since voltage integration ends at the point of time when the conducting plate is returned to the b-contact, heat generation in the current limiting circuit 30 can be reduced at removal of the plug 11 from the DC power source device 100 in the circuit in which two contacts are used as in FIG. 4.

Note that, in the above-described example, an n-type MOSFET is used for the MOSFET T1, and the current limiting circuit 30 having the voltage integrating function is disposed on the positive electrode side, whilst the present disclosure is not limited to such an example. A p-type MOSFET may be used, and the current limiting circuit 30 having the voltage integrating function may be disposed at the negative electrode.

Moreover, the above-described example has shown the case of DC power feeding in the two-wire system with positive and negative electrodes, whilst the current limiting circuit 30 having the voltage integrating function may also be disposed in the case of DC power feeding in a three-wire system with a positive electrode, neutral and a negative electrode. In the case of DC power feeding in the three-wire system, occurrence of an arc discharge at removal of the plug can be suppressed by disposing the current limiting circuits 30 at both electrodes of the positive electrode and the negative electrode.

Furthermore, in the above-described example, the movable contact piece 20c is provided for the DC power source device 100 as a momentary switch in which the elastic force of the spring 21 is utilized, whilst the present disclosure is not limited to such an example. For example, the touch target of the movable contact piece 20c may be switched between the contact element 24 and the contact element 25 by providing a button for the DC power source device 100 and operating the button with the plug 11 at insertion or removal of the plug 11.

Figure 9:
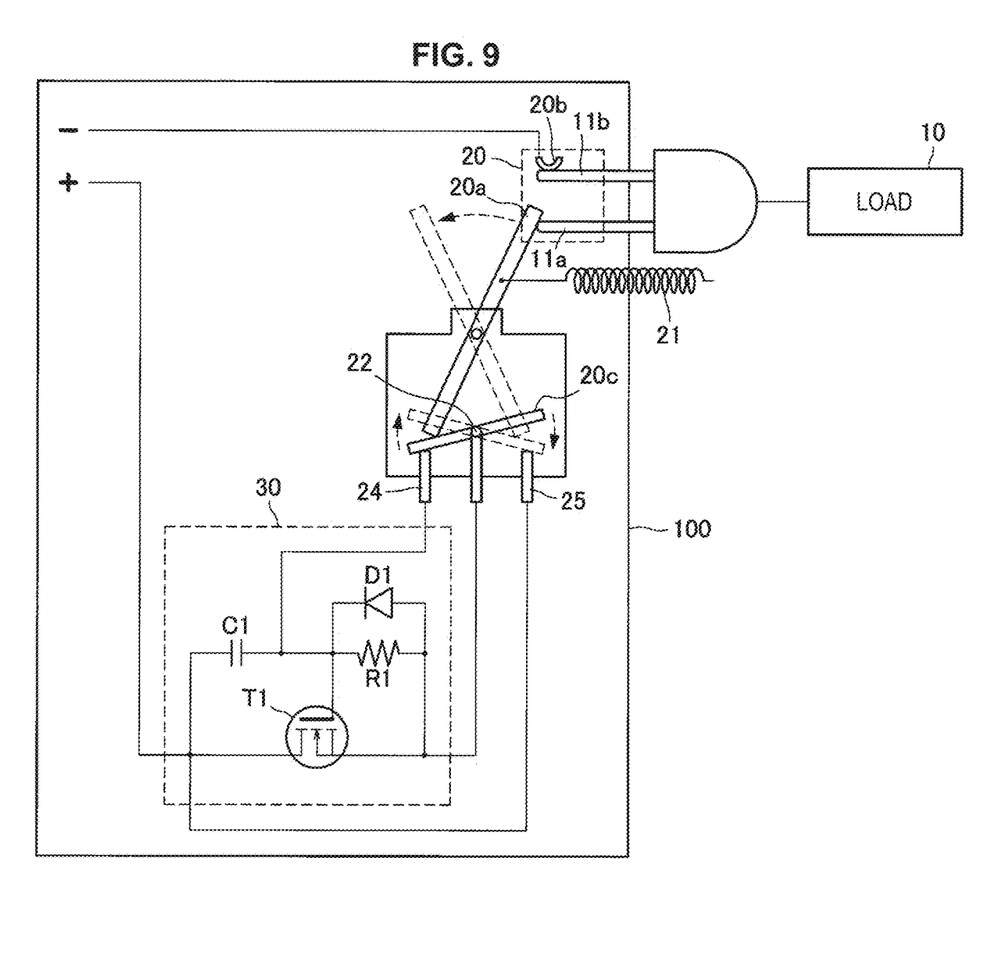
FIG. 9 is an explanatory diagram showing an exemplary configuration of the DC power source device 100.

Subsequently, another exemplary configuration of the DC power source device 100 shown in FIG. 2 will be described. FIG. 9 is an explanatory diagram showing an exemplary configuration of the DC power source device 100 according to an embodiment of the present disclosure. The DC power source device 100 shown in FIG. 9 is configured such that the contact element 20a and the movable contact piece 20c constitute a snap switch, and the contact element 20a is pivotable in a predetermined range in accordance with insertion of the plug 11.

The effects of the DC power source device 100 shown in FIG. 9 will be described. In a state where the plug 11 has not been completely inserted in the plug receiver 20 of the DC power source device 100, the contact element 20a is located at the frontward side (the position indicated by the solid line in FIG. 9) with the elastic force of the spring 21. With the contact element 20a located at the frontward side, the movable contact piece 20c is touching the contact element 24. Since the movable contact piece 20c is touching the contact element 24, the DC power source device 100 is in the state where the current flowing to the load 10 is restricted by the current limiting circuit 30.

When the contact element 20a is pressed toward the inner side along with insertion of the positive-electrode-side terminal 11a of the plug 11, the movable contact piece 20c touches the contact element 25. With the movable contact piece 20c touching the contact element 25, the DC power source device 100 can flow the current to the load 10 bypassing the current limiting circuit 30. Note that, actually, when the movable contact piece 20c touches the contact element 25 and DC power is fed from the DC power source device 100 to the load 10, the gate and the source of the MOSFET T1 are short-circuited, and the current flows only through the capacitor C1.

Then, when the plug 11 is removed from the plug receiver 20 of the DC power source device 100, the contact element 20a returns to the frontward side with the elastic force of the spring 21. With the contact element 20a returning to the frontward side, the movable contact piece 20c touches the contact element 24 again. With the movable contact piece 20c touching the contact element 24, the DC power source device 100 flows the current to the load 10 through the current limiting circuit 30, but the current decreases over time as shown in FIG. 8.

With the DC power source device 100 configured as shown in FIG. 9, when the plug 11 is removed from the plug receiver 20 of the DC power source device 100, the touch target of the movable contact piece 20c can be switched from the contact element 25 to the contact element 24 using the elastic force of the spring 21 without waiting for a current interruption time in the current limiting circuit 30.

By switching the touch target of the movable contact piece 20c from the contact element 25 to the contact element 24 using the elastic force of the spring 21 without waiting for a current interruption time in the current limiting circuit 30, the DC power source device 100 according to the present embodiment can reduce heat generation in the current limiting circuit 30, in particular, heat generation in the MOSFET T1 of the switching element when the plug 11 is removed from the plug receiver 20 of the DC power source device 100.

Note that FIG. 9 shows an example in which the contact element 20a and the movable contact piece 20c are configured as a snap switch in which the elastic force of the spring 21 is used, whilst the present disclosure is not limited to such an example. The contact element 20a and the movable contact piece 20c may be configured as a seesaw toggle switch, or the contact element 20a and the movable contact piece 20c may be configured as a spring-reversing toggle switch.

Figure 10:
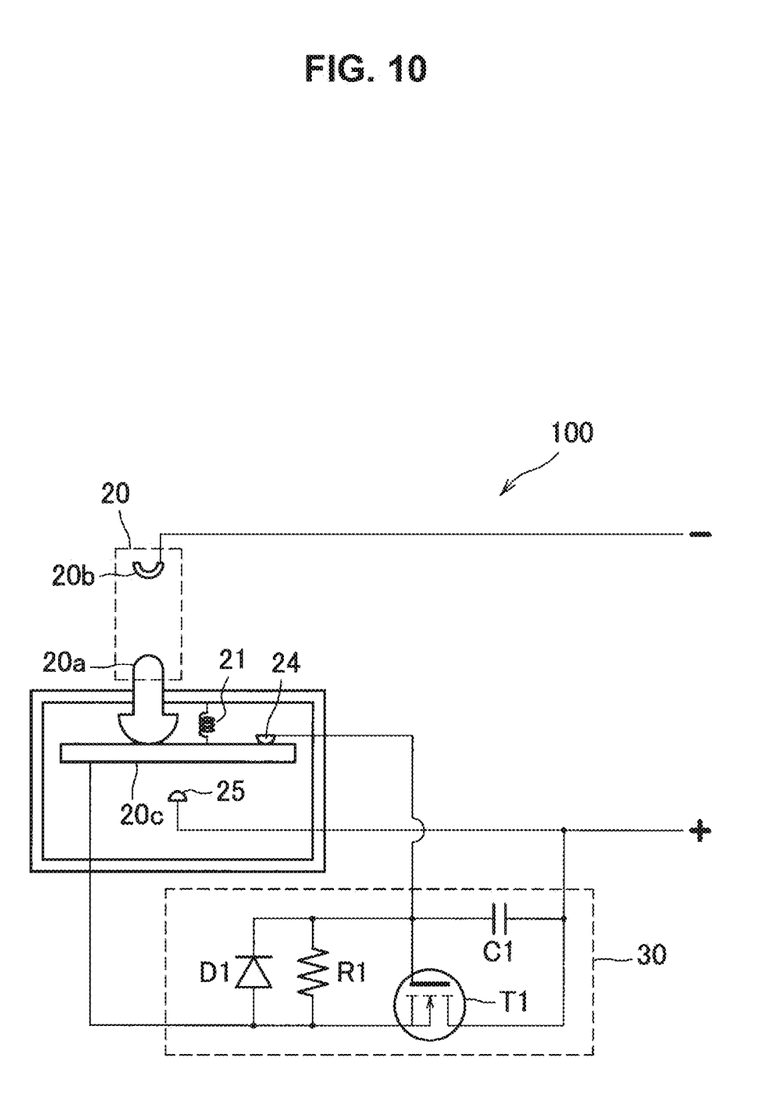
FIG. 10 is an explanatory diagram showing an exemplary configuration of the DC power source device 100.

Subsequently, another exemplary configuration of the DC power source device 100 shown in FIG. 2 will be described. FIG. 10 is an explanatory diagram showing an exemplary configuration of the DC power source device 100 according to an embodiment of the present disclosure. The DC power source device 100 shown in FIG. 10 is configured such that the contact element 20a and the movable contact piece 20c constitute a microswitch, and the contact element 20a is pressed in a predetermined range in accordance with insertion of the plug 11.

The effects of the DC power source device 100 shown in FIG. 10 will be described. In the state where the plug 11 has not been completely inserted in the plug receiver 20 of the DC power source device 100, the contact element 20a has not been pressed because of the elastic force of the spring 21, and the movable contact piece 20c is touching the contact element 24. Since the movable contact piece 20c is touching the contact element 24, the DC power source device 100 is in the state where the current flowing to the load 10 is restricted by the current limiting circuit 30.

When the contact element 20a is pressed toward the inner side along with insertion of the positive-electrode-side terminal 11a of the plug 11, the movable contact piece 20c touches the contact element 25. With the movable contact piece 20c touching the contact element 25, the DC power source device 100 can flow the current to the load 10 bypassing the current limiting circuit 30. Note that, actually, when the movable contact piece 20c touches the contact element 25 and DC power is fed from the DC power source device 100 to the load 10, the gate and the source of the MOSFET T1 are short-circuited, and the current flows only through the capacitor C1.

Then, when the plug 11 is removed from the plug receiver 20 of the DC power source device 100, the contact element 20a returns to the frontward side with the elastic force of the spring 21. With the contact element 20a returning to the frontward side, the movable contact piece 20c touches the contact element 24 again. With the movable contact piece 20c touching the contact element 24, the DC power source device 100 flows the current to the load 10 through the current limiting circuit 30, but the current decreases over time as shown in FIG. 8.

With the contact element 20a and the movable contact piece 20c of the DC power source device 100 configured as a micro switch as shown in FIG. 10, when the plug 11 is removed from the plug receiver 20 of the DC power source device 100, the touch target of the movable contact piece 20c can be switched from the contact element 25 to the contact element 24 using the elastic force of the spring 21 without waiting for a current interruption time in the current limiting circuit 30. By switching the touch target of the movable contact piece 20c from the contact element 25 to the contact element 24 using the elastic force of the spring 21 without waiting for a current interruption time in the current limiting circuit 30, the DC power source device 100 shown in FIG. 10 can reduce heat generation in the current limiting circuit 30, in particular, heat generation in the MOSFET T1 of the switching element when the plug 11 is removed from the plug receiver 20 of the DC power source device 100.

Note that FIG. 10 shows an example in which the contact element 20a and the movable contact piece 20c are configured as a microswitch in which the elastic force of the spring 21 is used, whilst the present disclosure is not limited to such an example. The contact element 20a and the movable contact piece 20c may be configured as a coil spring microswitch, or the contact element 20a and the movable contact piece 20c may be configured as a reversing spring microswitch.

2. Conclusion

According to an embodiment of the present disclosure as described above, the DC power source device 100 is provided which includes the current limiting circuit 30 that can function in the direction that a current flowing from the DC power source device 100 to the load 10 is gradually reduced when the plug 11 is removed from the DC power source device 100 while DC power feeding is performed from the DC power source device 100 to the load 10, and can suppress occurrence of an arc discharge when the plug 11 is removed from the DC power source device 100.

No current flows in the current limiting circuit 30 in the state where the plug 11 has been completely inserted in the DC power source device 100. The current limiting circuit 30 will not consume power while DC power feeding is performed from the DC power source device 100 to the load 10 since no current flows in the state where the plug 11 has been completely inserted in the DC power source device 100, and thus will not reduce power supply efficiency.

Then, the current limiting circuit 30 accumulates charges in the capacitor C1 by the current produced by the potential difference generated between the drain and the source of the MOSFET T1 when the plug 11 is removed from the DC power source device 100, and raises the gate voltage of the MOSFET T1 in accordance with the accumulation of charges in the capacitor C1 to turn on the MOSFET T1.

With the MOSFET T1 turned on by the accumulation of charges in the capacitor C1 to flow the current from the DC power source device 100 to the load 10 through the MOSFET T1, the current limiting circuit 30 can inhibit occurrence of a potential difference from a contact element which an electrode of the plug 11 has been touching so far to suppress occurrence of an arc discharge when the plug 11 is removed from the DC power source device 100.

Moreover, the DC power source device 100 according to an embodiment of the present disclosure includes the movable contact piece 20c capable of switching between supplying DC power to the load 10 without passing through the current limiting circuit 30 in the state where the plug 11 of the load 10 has been completely inserted in the plug receiver 20 and supplying DC power to the load 10 via the current limiting circuit 30 after the plug 11 of the load 10 is removed the plug receiver 20. The movable contact piece 20c is provided for the DC power source device 100 as a momentary switch in which the elastic force of the spring 21 is utilized, as shown in FIG. 2 and the like, for example.

By including the movable contact piece 20c serving as described above in accordance with insertion or removal of the plug 11, the DC power source device 100 according to an embodiment of the present disclosure can switch the touch target of the movable contact piece 20c from the contact element 25 to the contact element 24 without waiting for a current interruption time in the current limiting circuit 30.

By switching the touch target of the movable contact piece 20c from the contact element 25 to the contact element 24 using the elastic force of the spring 21 without waiting for a current interruption time in the current limiting circuit 30, the DC power source device 100 according to an embodiment of the present disclosure can reduce heat generation in the current limiting circuit 30, in particular, heat generation in the MOSFET T1 of the switching element when the plug 11 is removed from the plug receiver 20 of the DC power source device 100.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A DC power supply connector at least including:

a positive-electrode-side electrode and a negative-electrode-side electrode configured to supply DC power, in which provided on at least any of a positive-electrode-side electrode side and a negative-electrode-side electrode side are     a movable contact piece configured to touch a first contact in a state where a terminal on a power receiving side in which a DC current flows at supply of the DC power is inserted and configured to touch a second contact in a state where the terminal is not inserted, and     a current limiting circuit configured to include a switching element and configured to decrease the current flowing in the terminal through the movable contact piece when the terminal is removed, and the current limiting circuit does not flow a current to the switching element in the case where the movable contact piece is touching the first contact, and flows a current to the terminal through the movable contact piece until the movable contact piece is separated from the first contact and linked to the second contact, and gradually decreases the flowing current.

(2)

The DC power supply connector according to (1), in which, in the state where the terminal is not inserted, the movable contact piece touches the second contact with an elastic force of an elastic member.

(3)

The DC power supply connector according to (2),
in which the movable contact piece is configured as a snap switch in which the elastic force of the elastic member is used.

(4)

The DC power supply connector according to (2),
in which the movable contact piece is configured as a microswitch in which the elastic force of the elastic member is used.

(5)

The DC power supply connector according to any of (1) to (4),
in which the positive-electrode-side electrode or the negative-electrode-side electrode causes the movable contact piece to touch the first contact in the state where the terminal is inserted, and causes the movable contact piece to touch the second contact in the state where the terminal is not inserted.

(6)

The DC power supply connector according to any of (1) to (5),
in which the current limiting circuit decreases a potential difference between a positive electrode and a negative electrode of an apparatus that receives the DC power by gradually increasing a potential difference between the first contact and the second contact to decrease the current flowing between the movable contact piece and the terminal.

(7)

The DC power supply connector according to (6),
in which the switching element is brought into an on state at a time point when the movable contact piece is no longer connected to the first contact to decrease the current flowing in the terminal through the movable contact piece in a state where the movable contact piece is connected to the second contact.

(8)

The DC power supply connector according to (7),
in which the current limiting circuit includes a capacitive element configured to start being charged at a time point when the movable contact piece is no longer connected to the first contact to raise a gate voltage of the switching element in the state where the movable contact piece is connected to the second contact.

(9)

A DC power source device at least including:
a DC power source configured to supply DC power; and
a positive-electrode-side electrode and a negative-electrode-side electrode configured to supply the DC power from the DC power source,
in which provided on at least any of a positive-electrode-side electrode side and a negative-electrode-side electrode side are
a movable contact piece configured to touch a first contact in a state where a terminal on a power receiving side in which a DC current flows at supply of the DC power is inserted and configured to touch a second contact in a state where the terminal is not inserted, and
a current limiting circuit configured to include a switching element and configured to decrease the current flowing in the terminal through the movable contact piece when the terminal is removed, and
the current limiting circuit does not flow a current to the switching element in a case where the movable contact piece is touching the first contact, and flows a current to the terminal through the movable contact piece until the movable contact piece is separated from the first contact and linked to the second contact, and gradually decreases the flowing current.

REFERENCE SIGNS LIST

1 DC power supply system
10 load
11 plug
11a positive-electrode-side terminal
11b negative-electrode-side terminal
20 plug receiver
20a, 20b contact element
20c movable contact piece
21 spring
22 supporting point
23, 24, 25 contact element
30 current limiting circuit
100 DC power source device

The invention claimed is:

1. A DC power supply connector at least comprising:
a positive-electrode-side electrode and a negative-electrode-side electrode configured to supply DC power,
wherein provided on at least any of a positive-electrode-side electrode side and a negative-electrode-side electrode side are
a movable contact piece configured to touch a first contact in a state where a terminal on a power receiving side in which a DC current flows at supply of the DC power is inserted and configured to touch a second contact in a state where the terminal is not inserted, and
a current limiting circuit configured to include a switching element and configured to decrease the current flowing in the terminal through the movable contact piece when the terminal is removed, and
the current limiting circuit does not flow a current to the switching element in the case where the movable contact piece is touching the first contact, and flows a current to the terminal through the movable contact piece until the movable contact piece is separated from the first contact and linked to the second contact, and gradually decreases the flowing current.

2. The DC power supply connector according to claim 1, wherein, in the state where the terminal is not inserted, the movable contact piece touches the second contact with an elastic force of an elastic member.

3. The DC power supply connector according to claim 2, wherein the movable contact piece is configured as a snap switch in which the elastic force of the elastic member is used.

4. The DC power supply connector according to claim 2, wherein the movable contact piece is configured as a microswitch in which the elastic force of the elastic member is used.

5. The DC power supply connector according to claim 1, wherein the positive-electrode-side electrode or the negative-electrode-side electrode causes the movable contact piece to touch the first contact in the state where the terminal is inserted, and causes the movable contact piece to touch the second contact in the state where the terminal is not inserted.

6. The DC power supply connector according to claim 1, wherein the current limiting circuit decreases a potential difference between a positive electrode and a negative electrode of an apparatus that receives the DC power by gradually increasing a potential difference between the first contact and the second contact to decrease the current flowing between the movable contact piece and the terminal.

7. The DC power supply connector according to claim 6, wherein the switching element is brought into an on state at a time point when the movable contact piece is no longer connected to the first contact to decrease the current flowing in the terminal through the movable contact piece in a state where the movable contact piece is connected to the second contact.

8. The DC power supply connector according to claim 7, wherein the current limiting circuit includes a capacitive element configured to start being charged at a time point when the movable contact piece is no longer connected to the first contact to raise a gate voltage of the switching element in the state where the movable contact piece is connected to the second contact.

9. A DC power source device at least comprising:
a DC power source configured to supply DC power; and
a positive-electrode-side electrode and a negative-electrode-side electrode configured to supply the DC power from the DC power source,
wherein provided on at least any of a positive-electrode-side electrode side and a negative-electrode-side electrode side are
   a movable contact piece configured to touch a first contact in a state where a terminal on a power receiving side in which a DC current flows at supply of the DC power is inserted and configured to touch a second contact in a state where the terminal is not inserted, and
   a current limiting circuit configured to include a switching element and configured to decrease the current flowing in the terminal through the movable contact piece when the terminal is removed, and
the current limiting circuit does not flow a current to the switching element in a case where the movable contact piece is touching the first contact, and flows a current to the terminal through the movable contact piece until the movable contact piece is separated from the first contact and linked to the second contact, and gradually decreases the flowing current.

* * * * *